United States Patent
Paice et al.

(10) Patent No.: US 6,980,895 B2
(45) Date of Patent: Dec. 27, 2005

(54) ELECTRONIC CONTROL SYSTEM FOR AGRICULTURAL VEHICLE

(75) Inventors: Mark Paice, Essex (GB); Paolo Ferracin, Ravarino (IT); Milton Abernethy, London (GB)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 10/916,152

(22) Filed: Aug. 11, 2004

(65) Prior Publication Data

US 2005/0027422 A1    Feb. 3, 2005

Related U.S. Application Data

(63) Continuation of application No. 10/281,608, filed on Oct. 28, 2002, now abandoned.

(30) Foreign Application Priority Data

Dec. 3, 2001  (GB) .................. 01.28.803

(51) Int. Cl.[7] .................. G06F 19/00; G06F 7/70
(52) U.S. Cl. .................. 701/50; 701/35; 701/115; 172/2; 37/414; 434/29
(58) Field of Search .................. 701/1, 33, 35, 701/48, 50, 102, 115; 172/1–2, 4.5, 5, 7, 172/10; 37/414; 414/699–701, 730; 318/568.1, 318/568.13, 568.14, 568.16, 568.2, 568.25, 318/567; 434/29

(56) References Cited

U.S. PATENT DOCUMENTS

| | | | | |
|---|---|---|---|---|
| 4,105,937 A | * | 8/1978 | Tuda et al. .......... | 318/568.14 |
| 4,600,999 A | * | 7/1986 | Ito et al. .......... | 701/25 |
| 5,274,557 A | * | 12/1993 | Moriya et al. .......... | 701/50 |
| 5,359,517 A | * | 10/1994 | Moriya et al. .......... | 701/50 |
| 5,493,798 A | * | 2/1996 | Rocke et al. .......... | 37/348 |
| 5,899,950 A | * | 5/1999 | Milender et al. .......... | 701/50 |
| 5,995,895 A | * | 11/1999 | Watt et al. .......... | 701/50 |
| 6,064,933 A | * | 5/2000 | Rocke .......... | 701/50 |
| 6,076,030 A | * | 6/2000 | Rowe .......... | 701/50 |
| 6,131,062 A | * | 10/2000 | Nielsen .......... | 701/50 |
| 6,292,729 B2 | * | 9/2001 | Falck et al. .......... | 701/50 |
| 2003/0070819 A1 | * | 4/2003 | Hrazdera .......... | 172/2 |

FOREIGN PATENT DOCUMENTS

| | | | |
|---|---|---|---|
| EP | 0 448 716 | * | 10/1995 |
| EP | 1 316 868 | * | 6/2003 |
| FR | 2764401 | * | 12/1998 |

* cited by examiner

Primary Examiner—Gertrude A. Jeanglaude
(74) Attorney, Agent, or Firm—John William Stader

(57) ABSTRACT

An electronic control system for use in an agricultural vehicle having a hitch for towing an implement. The control system controls any one or more of a plurality of subsystems relating to the vehicle operation. The electronic control system includes a memory, a recording mode, and a playback mode. In one aspect of the invention, the driver is enabled during the recording mode to record a break signal in addition to, and without interruption of, the recording of the sequence of control steps being executed by the driver and in that during the playback mode automatic execution of the recorded control steps is interrupted upon detection of a break signal, execution of the remaining recorded control steps in the sequence being resumed only in response to an instruction from the vehicle driver.

4 Claims, 3 Drawing Sheets

ELECTRONIC CONTROL SYSTEM FOR AGRICULTURAL VEHICLE

This application is a continuation of U.S. patent application Ser. No. 10/281,608, filed Oct. 28, 2002, now abandoned.

BACKGROUND OF THE INVENTION

The present invention relates to a control system for an agricultural vehicle.

Many field operations (in particular cultivation) require the driver to repeat a set of operations each time he traverses the field and turns the tractor at a headland. As implements become more complicated these repeated operations become monotonous and tiring. Tractors that have some or all of these operations under electronic control lend themselves to the automation of this repetitive task.

Several HTS (Headland Turn Sequence) systems have been developed by tractor manufacturers with the aim of reducing the number of repetitive movements that the driver is required to perform. These systems range from simple automatic disabling of the PTO (power take-off shaft) when the hitch is raised to recording and playback of a complex sequence of operations. Systems differ in the way in which the sequence is recorded and played back and the aim of the present invention is to provide a control system that allows experienced vehicle drivers a degree of control over the recording and playing back of sequences while also permitting fully automated operation, which is more suitable for inexperienced drivers.

SUMMARY OF THE INVENTION

In accordance with a first aspect of the present invention, there is provided an electronic control system for use in an agricultural vehicle having a hitch for towing an implement, the control system being operative to control any one or more of a plurality of sub-systems serving to set the vehicle engine speed, the selected transmission ratio, the hitch position to raise and lower the implement, the estimated flow in electro-hydraulic remote (EHR) lines connectable to actuators of the towed implement, and the engagement state of the power take off shaft in which the electronic control system includes a memory, a recording mode during which a sequence of control steps is stored in the memory while such steps are being executed under instruction from the vehicle driver, and a playback mode during which a previously recorded sequence of steps is read from the memory to produce control signals to enable the correct sequence of steps to be executed automatically by the control system, in which means are provided for enabling the driver during the recording mode to record a break signal in addition to, and without interruption of, the recording of the sequence of control steps being executed by the driver and in that during the playback mode automatic execution of the recorded control steps is interrupted upon detection of a break signal, execution of the remaining recorded control steps in the sequence being resumed only in response to an instruction from the vehicle driver.

It is preferred, as is already known, for control systems to be able to record and replay several sub-sequences. For example, the geometry of a field may be different at its opposite ends and different sub-sequences may be needed for the different ends of the field. To achieve this, the driver in the preferred embodiment of the invention is able to pause recording after terminating a sub-sequence for one end of the field and to resume recording when approaching the other end of the field to store a second sub-sequence.

Such pausing differs from the recording of a break signal as proposed in the present invention because after a pause the recording of all control steps is stopped and recording of the control steps of the next sub-sequence only recommences after an instruction is received from the driver, even though the control system is still operating in the recording mode. By contrast, a break signal does not interrupt the recording process and is instead inserted within a sub-sequence rather than acting to separate sub-sequences from one another. No action is required by the driver in the recording mode after a break signal has been stored. It is only in playback mode that an instruction is required from the driver to permit resumption of the control steps stored in the sub-sequence.

The provision of a break signal by the present invention allows the driver to "step through" a series of steps, each step commencing under driver instruction. In between break signals within each sub-sequence, however, the previously recorded steps are executed automatically.

Thus, an important concept in the present invention is the resulting presence of "implicit" and "explicit" steps. During recording, an implicit step for a given sub-system will end when another sub-system is controlled. An explicit step will start when a dedicated button (herein termed a sequence step button) is actuated. When playing back the sequence, the system will wait for the sequence step button switch to be pressed before explicit but not implicit steps. In this way, the system can be used in a simple way by an inexperienced driver without pressing the sequence step button other than to start recording and playing. An experienced driver on the other hand is able to add flexibility to the sequence by inserting explicit steps when required.

It is important to be able to provide the driver a feedback regarding the current state of the HTS system. With this aim in mind, the present invention provides in accordance with a second aspect, an electronic control system for use in an agricultural vehicle having a hitch for towing an implement, the control system being operative to control any one or more of a plurality of sub-systems serving to set the vehicle engine speed, the selected transmission ratio, the hitch position to raise and lower the implement, the estimated flow in electro-hydraulic remote (EHR) lines connectable to actuators of the towed implement, and the engagement state of the power take off shaft, the electronic control system including a memory, a recording mode during which a sequence of control steps is stored in the memory while such steps are being executed under instruction from the vehicle driver, and a playback mode during which a previously recorded sequence of steps is read from the memory to produce control signals to enable the correct sequence of steps to be executed automatically by the control system, wherein the control system incorporates a display panel and such that during the playback mode icons are displayed on the panel to indicate to the vehicle driver graphically a plurality or all of the steps of a sequence recorded in the memory in their correct order of execution together with a visual indication of the step in the recorded sequence currently being executed.

Preferably, the sequence of recorded steps is displayed on a panel serving additionally to provide an indication of the selected gear ratio.

In a preferred embodiment of the invention, a dedicated area of the Display Of Gears (DOG) is allocated to the HTS system. Eight square LCD matrix regions arranged vertically on the left hand side of the DOG may be used to show icons related to HTS state, current subsystem involved and subsequent subsystems in the sequence.

When initiating HTS Playback with the sequence step button a number, which is allocated sequentially to all sub-sequences by the system during the recording phase, will be displayed. If the sequence step button is held down, subsequent sub-sequence numbers will be displayed in turn. Releasing the HTS Control button while a sub-sequence number is displayed will select the indicated sub-sequence. This function will allow the operator to select the correct sub-sequence e.g. when restarting work at one end of a field for which the sequence was previously recorded.

It is an advantage of the invention that this feature may remain transparent to the inexperienced user and if only one sub-sequence is stored the sub-sequence number will not be displayed. It is to be noted that the sequence will remain stored in non-volatile memory until overwritten.

These and other objects, features and advantages are accomplished according to the instant invention by providing an electronic control system for use in an agricultural vehicle having a hitch for towing an implement. The control system controls any one or more of a plurality of sub-systems serving to set the vehicle engine speed, the selected transmission ratio, the hitch position to raise and lower the implement, the estimated flow in electro-hydraulic remote (EHR) lines connectable to actuators of the towed implement, and/or the engagement state of the power take off shaft. The electronic control system includes a memory, a recording mode during which a sequence of control steps is stored in the memory while such steps are being executed under instruction from the vehicle driver, and a playback mode during which a previously recorded sequence of steps is read from the memory to produce control signals to enable the correct sequence of steps to be executed automatically by the control system. In one aspect of the invention, the driver is enabled during the recording mode to record a break signal in addition to, and without interruption of, the recording of the sequence of control steps being executed by the driver and in that during the playback mode automatic execution of the recorded control steps is interrupted upon detection of a break signal, execution of the remaining recorded control steps in the sequence being resumed only in response to an instruction from the vehicle driver.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
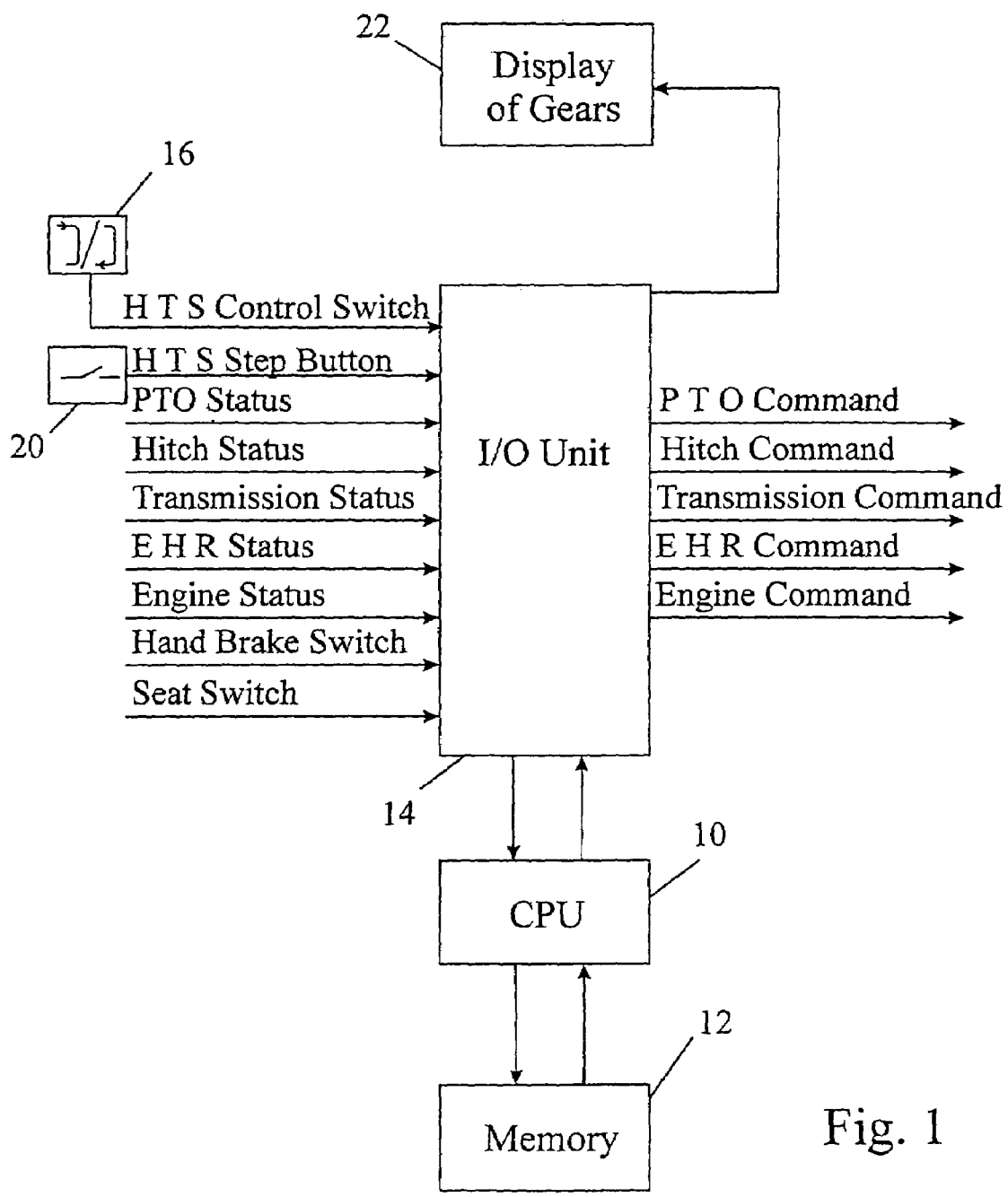
FIG. 1 shows a block diagram of a control system of the invention for use in an agricultural vehicle.

The control system is implemented in FIG. 1 as a conventional on-board vehicle computer composed of a processing unit 10, a memory 12 and an input/output unit 14. The computer receives as inputs signals indicative of the status of various sub-systems and components including the power take off (PTO), the hitch, transmission, electro-hydraulic remote (EHR), the engine, the hand brake and driver's seat occupancy switch. The system also produces as outputs signals that control the same sub-systems namely the PTO, the hitch, the transmission, the EHR and the engine. For the purposes of implementing the present invention, the control system receives in addition signals from an headland turn sequence (HTS) control switch 16 and an sequence step button 20. An output from the computer is also used to drive the display of gears 22 (DOG) to inform the driver of the status of the HTS.

Figure 2:
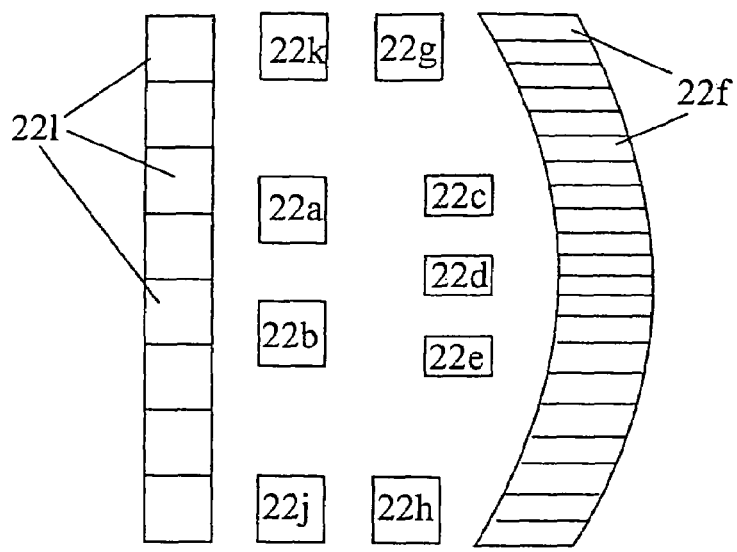
FIG. 2 is an illustration of the display of gears.

The DOG 22 as shown in more detail in FIG. 2 is an LCD panel with several display areas. Two numeric display areas 22a and 22b indicate the currently selected forward and reverse gears. Three icons 22c, 22d and 22e are used to indicate if the transmission is set in forward, neutral or reverse and a strip 22f to the right of these icons is used to provide an analogue like display of the selected gears. Two further icons 22g and 22h indicate if the vehicle is set for road use or field use and an icon 22j is used to warn the driver of a problem requiring urgent attention. All the above indicators are to be found on a convention DOG. In the present invention, further display areas are provided on the DOG and are associated with the HTS control system. In particular a display area 22k is used to advise the driver if the HTS control system is active and if so whether it is in record or playback mode. Eight further display areas 22l arranged in row down the left hand side of the DOG as viewed are used to display to the driver the sub-sequence number and the steps that constitute the sub-sequence in their order of execution.

Figure 3:
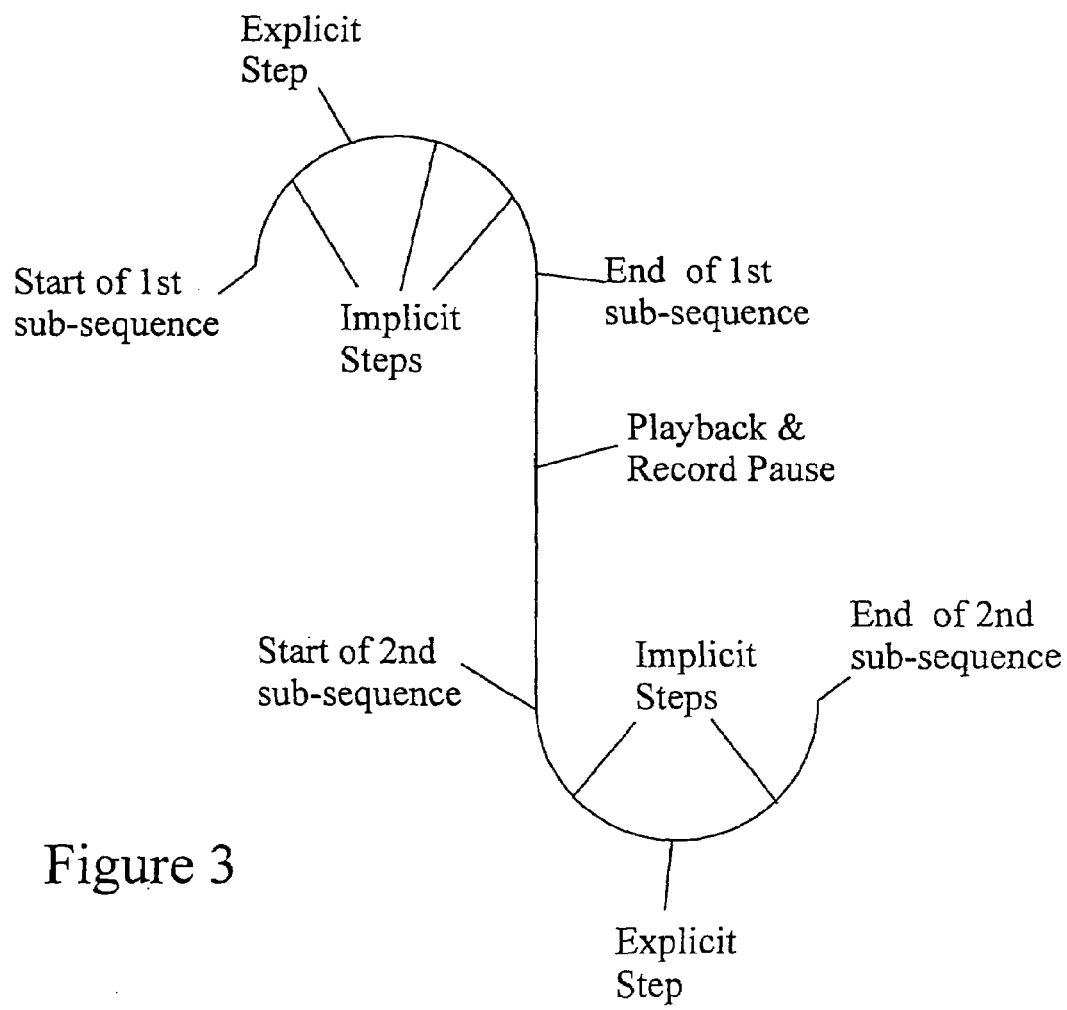
FIG. 3 is a diagrammatic representation of the steps that form a complete sequence that is made up of two sub-sequences to be executed when working at opposite ends of a field.

FIG. 3 represents the steps involved in working the whole length of a field and two headlands at its opposite ends. In recording mode, on approaching the first headland, the driver presses the HTS control switch to commence recording. All the steps then taken by the driver such as changing gear, reducing speed, raising the hitch and rotating the shears of a towed plough are stored as implicit steps. In addition, whenever the driver so wishes, he has the option of recording a break signal by pressing the sequence step button. This makes the next control step explicit and as will be explained this will result in the next step having to be initiated by the driver rather than automatically during the playback mode. On ending the turn at the first headland, the driver can pause recording so that the control steps effected while working the length of the field are not stored. On reaching the opposite end of the field, the driver can commence recording a new sub-sequence for the opposite headland in the same way as was done for the first. Eventually, the driver can cease recording by once again operating the HTS control switch.

Figure 4:
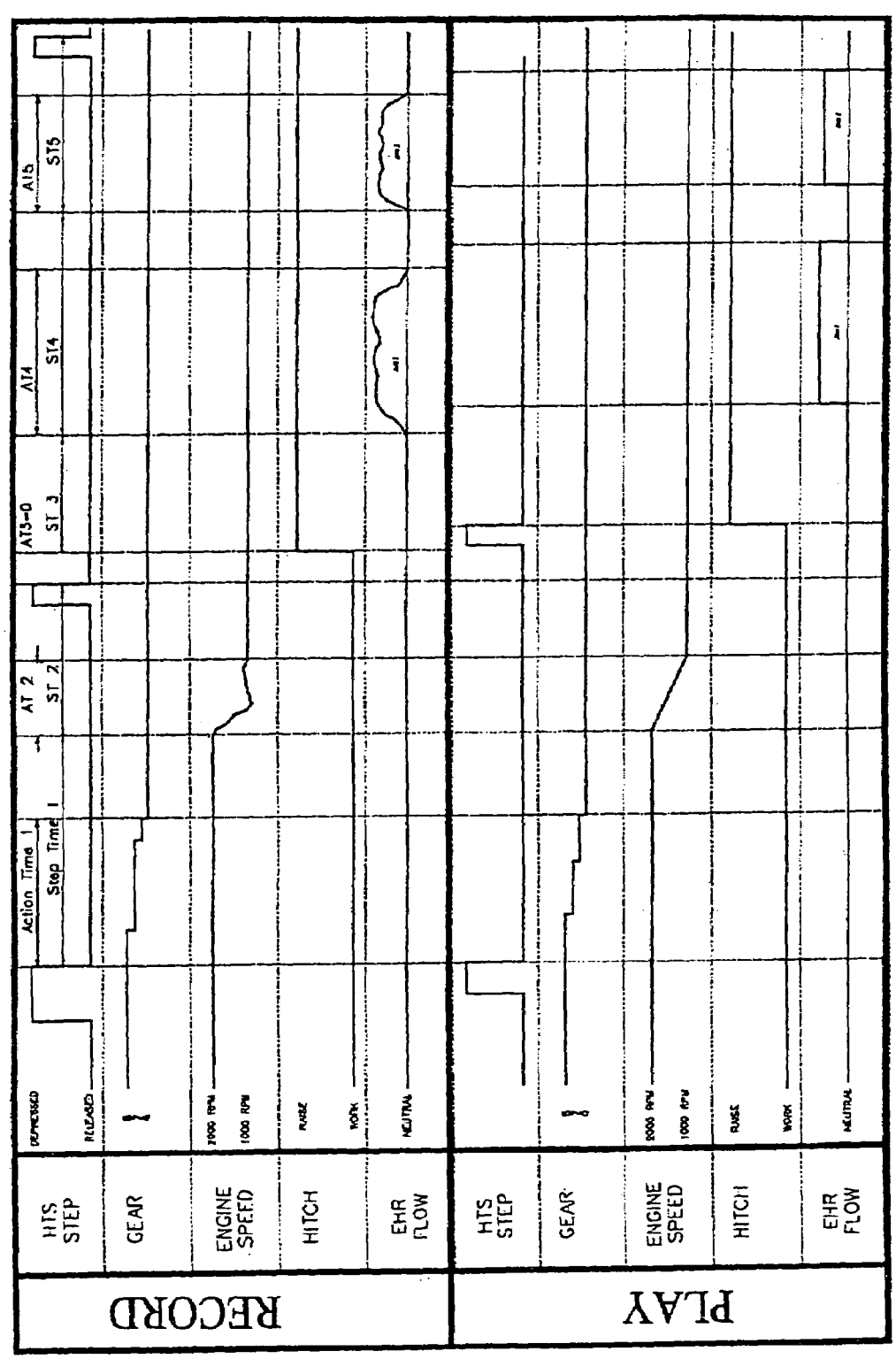
FIG. 4 is a chart illustrating a typical sub-sequence of control steps as recorded and subsequently played back.

A typical sub-sequence of control steps recorded by the driver is shown in the upper half of FIG. 4. As well as recording the selected gear, the engine speed, hitch position (for raising the plough) and EHR flow (for rotating the shears) the system also records the position of the sequence step button. In the illustrated example, the stored sub-sequence shows three down shifts of the gears, followed by a reduction in engine speed, raising of the hitch and then operating of the EHR to rotate the plough shears. The recording of the sub-sequence is commenced by first pressing the HTS control switch to select the recording mode and subsequently actuating the sequence step button. The gear changes and the engine speed reduction are all implicit steps that are repeated automatically when in playback mode without driver intervention. However, as can be seen, the sequence step button was operated prior to the raising of the hitch, making the latter an explicit step.

During the playback mode, shown in the lower half of FIG. 4, the driver commences playback by first operating the HTS control switch to select the playback mode then actuating the sequence step button. The first control step involves a down shifting of the gears and this is commenced automatically as this constitutes an implicit step. The last gear change in playback mode is effected at the same time as the last gear change during the recording mode but the three gear changes are spaced out evenly. Similarly, the following control step which involves a drop in engine speed brings the engine speed down to the same value at the same time following commencement of the sub-sequence (from the trailing edge of the signal of the sequence step button) but the engine speed change is performed more evenly and does not exactly replicate the speed change during the recording mode.

The next control step of raising the hitch was made explicit by operating the sequence step button. Because of this, the hitch is not raised in playback mode until the driver presses the HTS and the raising of the hitch coincides exactly with the trailing edge of the sequence step button signal. From this point on the implicit steps, such as initiating EHR flow are performed automatically but their timing is referenced to the trailing edge of the preceding operation of the sequence step button rather than to the starting of the sub-sequence.

The status of the HTS control system is always displayed to the driver. During recording mode, as each implicit step is executed by the driver an icon is added to the display areas on the left of the DOG. In playback mode, the same icons are displayed together with any break signals. The driver can therefore see at a glance what step is being executed, which will be executed next and which requires operation of the sequence step button before it can be executed.

Requirements

A headland turn automation system needs to be capable of adapting to changes in field shape and other variations in headland topography. For example where tramlines meet the headland at an acute angle in the corner of the field the operator may have to reverse the tractor whereas this would not normally be part of the sequence. The system must be safe and usable with a wide variety of implement types.

It should be possible to end the sequence both implicitly and explicitly i.e. by actuating a switch or by adjusting any control that is not compatible with the sequence unless the sequence has been first explicitly paused.

It is acceptable to stop the PTO but a system of interlocks is required if it is to be allowed to restart automatically.

The first automatic stored sequence must require two actions on the part of the driver to initiate.

Sub-systems involved in the headland turn sequencing may include engine speed, transmission gear, hitch (rear and front), PTO disengagement (rear and front), and auxiliary valves EHRs (recording time and average flow rate). The sub-systems may also include 4WD/DL.

Operator Interface

The HTS system of the preferred embodiment of the invention includes the following elements.

HTS Control Switch

This is a three position rocker switch biased in the centre position and allows the operator to select HTS "play" and "record" modes.

Sequence Step Button

This is a momentary push button to allow the user to step through the stored sequence.

Display of Gears (DOG)

This display has an area dedicated to the HTS system which comprises eight reconfigurable icon areas each comprising an LCD matrix (16×16) to show the current and next seven sub-systems to be affected in the sequence. This display is also used to show the sequence being constructed in "Record" mode. In addition, the display includes a "bespoke" LCD icon to show that headland turn sequencing is activated.

These various elements are connected to a programmed computer which also receives input from and sends control signals to the various sub-systems involved. The construction of the computer and the program code are not described herein in detail, and instead they are characterised by the functions that they carry out, which are described below in more detail.

System Operation

A. Storing a Sequence

The HTS Control switch is held in the left position (showing record icon (picture)) for five seconds. A short audible alarm sounds and the DOG displays the bespoke "HTS" icon and the "Record icon" flashing in the topmost dot matrix area region.

Recording does not start until the operator presses the sequence step button. Each controlling action affecting a particular sub-system of the tractor is stored as an implicit step in the sequence. For example, a change of throttle position would be a step even if the engine speed is still ramping when the next step starts. A number of consecutive gear shifts on the bone would be a single implicit step. At any time during recording the user can press the sequence step button. This will insert an explicit step in the sequence.

During playback, the sequence will pause after each explicit step in the sequence. The recording state will be suspended when the user presses and holds the sequence step button for two seconds. The system will remain in record mode but no further implicit or explicit steps will be added to the sequence.

During Recording the topmost icon of the dot matrix area will display the "Record" symbol, the next icon will display the symbol referring to the sub-system step currently being recorded and the subsequent icons will display icons related to the sub-systems previously recorded (topmost most recent).

B. Activating a Sequence

A sequence will enter a "Ready to play" state only when the HTS control switch is put in the playback position. The DOG will display icons relating to the sub-systems affected by the first six steps in the sequence. The first icon will be displayed in inverse.

C. Replaying a Sequence

When the HTS Control switch is pressed to enable replaying, the topmost icon of the DOG will show the "Play" icon flashing and the subsequent icons will show the sub-systems to be controlled by the sequence in order of topmost first.

When the sequence step button is actuated to start playing the sequence, the first step in the sequence will be actioned and its related icon will be displayed in inverse. The icon relating to that step will be deleted from the display when the next step is actioned and all the icons will move up one place and a new icon may appear at the bottom (if there are more than 7 icons in the sequence). Playback will be interrupted on explicit step boundaries which will be shown on the display with a "break" icon.

Pressing the sequence step button again will action the next step etc. Each time the sequence step button is pressed there will be a short beep.

D. Suspending a Sequence

Sequence recording is temporarily suspended or paused by holding down the sequence step button for some seconds. Pressing the button again resumes recording the next sub-sequence. During suspension or pausing of recording, the Record icon will be shown in inverse in the topmost region of the dot matrix area. During play mode, playback will be suspended at this point in the sequence and only resumed when the sequence step button is pressed. This allows manual operation in between opposite headlands with no risk of accidentally going into automated steps. The system will treat each set of steps separated by these pauses as separate sub-sequences and it will be possible to select the sequence with which to start field operations by pressing and holding the HTS control switch in the "Playback" position, while monitoring the sequence number on the display.

In the preferred embodiment of the invention, it is not necessary to record every event to be replayed in such a manner as to enable it to be replayed identically. It suffices instead to record for each such event the overall duration, the time taken to complete the control action and the final value of the variable under control. Thus, if several gear changes are to be effected in sequence, it is not essential to record when each gear change is made during the recording mode, it suffices to note the moment at which the first gear change occurs and to spread the appropriate number of gear changes over the same length of time as in the recording mode. The same would apply to a change in throttle position or to variations in the flow in the hydraulic lines acting to raised and lower the hitch.

The starting conditions during the playback for any given sequence need not necessarily match identically the starting conditions that prevailed during the recording mode. For example, a gear changing sequence could in recording mode shift from sixth gear to fourth gear, whereas, in playback mode, the sequence could be commenced while the vehicle is in fifth gear. The system will not in this case change down by two gear ratios but will change down into fourth gear and remain there. The important criterion is thus the engaged gear at the end of the sequence rather than the number of steps required to reach it.

It should also be noted that by using CAN bus technology, the system can determine during the recording phase the nature of any actions taking place so that it can attach the right icon to the proper sequence being effected, such as gear shifting up or down, raising or lowering of the hitch, increasing or decreasing of the engine speed, etc.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An electronic control system for use by an operator in an agricultural vehicle having a hitch for towing an implement, the control system being operative to control any one or more of a plurality of sub-systems serving to set the vehicle engine speed, the selected transmission ratio, the hitch position to raise and lower the implement, the estimated flow in electro-hydraulic remote lines connectable to actuators of the towed implement, and the engagement state of the power take off shaft, the electronic control system comprising:
   a memory;
   a recording portion operable in a recording mode for storing in the memory a sequence of control steps while such steps are being executed under instruction from the operator, the control system being operable during the recording mode to record a break signal in addition to, and without interruption of, the storing of the sequence of control steps being executed by the operator; and
   a playback portion operable in a playback mode for reading a previously recorded sequence of steps from the memory to produce control signals to enable the correct sequence of steps to be executed automatically by the control system, the system being operable to interrupt the automatic execution of the recorded control steps during the playback mode upon detection of a break signal, execution of remaining recorded control steps in the sequence being resumed only in response to an instruction from the operator.

2. The control system as claimed in claim 1, wherein the control system is able to record and replay several sub-sequences separated by pauses.

3. The control system as claimed in claim 2, wherein the recording of each sub-sequence includes a time of commencement of an event, a length of duration of the event, and selected values of any variable changed by the event at the commencement and termination of the event.

4. An electronic control system for use by an operator in an agricultural vehicle having a hitch for towing an implement, the control system being operative to control any one or more of a plurality of sub-systems serving to set the vehicle engine speed, the selected transmission ratio, the hitch position to raise and lower the implement, the estimated flow in electra-hydraulic remote lines connectable to actuators of the towed implement, and the engagement state of the power take off shaft, the electronic control system comprising a memory and software for executing the steps of:
   recording a sequence of control steps in the memory while such steps are being executed under instruction from the operator,
   recording a break signal in addition to, and without interruption of, the recording of the sequence of control steps being executed by the operator;
   reading a previously recorded sequence of steps from the memory to produce control signals to enable the correct sequence of steps to be executed automatically by the control system; and
   interrupting the automatic execution of the recorded control steps during the step of reading upon detection of a break signal, execution of the remaining recorded steps in the sequence being resumed only in response to an instruction from the operator.

* * * * *